US006985872B2

(12) United States Patent
Benbassat et al.

(10) Patent No.: US 6,985,872 B2
(45) Date of Patent: Jan. 10, 2006

(54) METHOD AND SYSTEM FOR ASSIGNING HUMAN RESOURCES TO PROVIDE SERVICES

(75) Inventors: Moshe Benbassat, Los Altos, CA (US); Amit Bendov, Burlington, MA (US); Simon Arazi, Jerusalem (IL); Michael Karlskind, Burlington, MA (US); Israel Beniaminy, Ramat Gan (IL)

(73) Assignee: Clicksoftware Technologies Ltd., Tel Aviv (IL)

( * ) Notice: Subject to any disclaimer, the term of this patent is extended or adjusted under 35 U.S.C. 154(b) by 0 days.

(21) Appl. No.: 10/167,261

(22) Filed: Jun. 10, 2002

(65) Prior Publication Data

US 2003/0033184 A1 Feb. 13, 2003

Related U.S. Application Data

(63) Continuation of application No. PCT/IL01/00881, filed on Sep. 17, 2001.

(30) Foreign Application Priority Data

Oct. 3, 2000 (IL) .................................... 138828

(51) Int. Cl.
*G06F 17/60* (2006.01)
(52) U.S. Cl. ........................... 705/8; 9/7; 9/1
(58) Field of Classification Search ............... 705/9, 705/8, 7, 1
See application file for complete search history.

(56) References Cited

U.S. PATENT DOCUMENTS

| | | | | |
|---|---|---|---|---|
| 5,524,077 A | * | 6/1996 | Faaland | 705/8 |
| 5,634,056 A | * | 5/1997 | Casotto | 707/203 |
| 5,799,286 A | * | 8/1998 | Morgan et al. | 705/30 |
| 6,072,493 A | * | 6/2000 | Driskell et al. | 345/854 |
| 6,539,379 B1 | * | 3/2003 | Vora et al. | 707/6 |
| 6,571,215 B1 | * | 5/2003 | Mahaparto | 705/8 |
| 6,574,605 B1 | * | 6/2003 | Sanders et al. | 705/8 |
| 6,578,068 B1 | * | 6/2003 | Bowman-Amuah | 709/203 |

(Continued)

FOREIGN PATENT DOCUMENTS

WO    WO 97/31320    *   8/1997

(Continued)

OTHER PUBLICATIONS

ServicePower, vol. www.servicepower.com; Sep. 28, 2000.

(Continued)

*Primary Examiner*—John G. Weiss
*Assistant Examiner*—Akiba Robinson-Boyce
(74) *Attorney, Agent, or Firm*—Frommer Lawrence & Haug LLP; William S. Frommer (57) ABSTRACT

A system for assigning human resources to service tasks. A long term forecasting module enables one or more users simultaneously working on that module to assign tasks that should be fulfilled in the each specific region, based on analysis of past demand and actual service operations. A mid-term planning module enables one or more users simultaneously working on that module to roughly allocate resources to fulfill actual future tasks and expected task demands. A short-term scheduling module enables one or more users simultaneously working on that module to roughly allocate specific human resources to fulfill actual tasks. A coordination module immediately propagates any change in the parameters of the human resource assignments resulting at any one of the forecasting, planning or scheduling modules to effect the other two modules. An analyzing module repeatedly checks the assignment actual status upon any introduction of an assignment update by the forecasting and planning modules to detect discrepancies and to generate alerts to correct those discrepancies.

14 Claims, 6 Drawing Sheets

U.S. PATENT DOCUMENTS 6,591,255 B1 * 7/2003 Tatum et al. .................. 706/25
6,611,726 B1 * 8/2003 Crosswhite .................. 700/99

FOREIGN PATENT DOCUMENTS

WO     WO 98/00804    *   1/1998

OTHER PUBLICATIONS

Blue Pumpkin; vol. www.bluepumpkin.com; (1996-2000 Blue Pumpkin Software, Inc.).

i2; www.i2.com; Sep. 28, 2000 (1999, i2 Techbologies, Inc.).

* cited by examiner

| | Who | When | What | for Whom | Where | Comment |
|---|---|---|---|---|---|---|
| Very Rough Macro Decisions | Group A | August | DSL Installation (very specific) | Customers in Area A | Area A | Known (or estimated) aggregated demand in Area A for August, group of people allocated, no one assigned to specific jobs |
| Less Rough Macro | Steve Kelly | August | DSL Installation (very specific) | Customers in Area A | Area A | Specific person allocated to area A for specific job in the month of August, yet not assigned to specific customers and not what specifying exactly what he does every day |
| | Group A | August 7-21 | Internet Access Jobs (Variety) | Bank of America | Branch on 1 Main Street | |
| Appointment Booking | Someone Qualified | Between 8 to 12 | Telephone line repair | Bank of America | Branch on 1 Main Street | |
| Very Specific Micro Decisions | Steve Kelly | 9 to 10 | Telephone line repair | Bank of America | Branch on 1 Main Street | Every dimension is specified at its most atomic level |

METHOD AND SYSTEM FOR ASSIGNING HUMAN RESOURCES TO PROVIDE SERVICES

This is a continuation of copending international application PCT/IL01/00881 having an international filing date of 17 Sep. 2001.

FIELD OF THE INVENTION

The present invention relates to the field of managing service organizations. More particularly, the invention relates to a method and system for human-resource assigning.

BACKGROUND OF THE INVENTION

A critical role of process management is ensuring the match of available resources to the tasks the organization is required to perform. In service processes, the main resources are the service professionals (such as field service engineers, help desks or call center agents, insurance assessors, business consultants, etc.) with their available work hours. Other resources include vehicles, tools and equipment, spare parts, office space (e.g., meeting rooms), etc.

The service tasks are usually initiated by customer demands, and typically, they are not predictable on the micro-level. There is no way to predict when a specific customer will call and request a service.

Thus, the service organization faces the challenge of accurately managing the size, mix of skills and regional allocation of its resources to meet future unknown and unpredictable demands. Erring by allocating too few resources results in failing to meet customer expectations, risking losing customers, and sometimes also requiring the service organization to pay contract-specified penalties. Erring by allocating too many resources results in spending excessive money on resources that are not fully utilized. Time cannot be stored, and thus every hour that a resource is not utilized is lost forever (this is in contrast to manufacturing of physical goods, in which extra machine capacity may be used to produce a stock which will be sold later). Obviously, it is not enough to decide on one group of service professionals for the whole organization. The decision needs to pare down to some extent (depending on the organization). For example, setting number of service professionals for each region serviced by the organization, and within a region setting the size of staff in each skill category or product line (e.g. installation experts vs. maintenance experts) in each region.

PRIOR ART

Characteristic Work Flow

The four discrete steps that typically characterizes a service-management decision process are:

Analysis: Using statistical and data-analysis methods to project past trends into future expectations of size and types of demands in the regions and time periods of interest.

Forecasting: Combining data from analysis with knowledge of expected events (e.g., product launch) to get a rough prediction of the number and types of demands in the regions and time periods of interest. Unlike analysis, forecasting requires making management decisions when choosing between different possible future scenarios and different possible interpretations of past data.

Planning: Capacity assessment and planning of manpower using the forecasted demand data, assessing whether there is a shortage or surplus, and accordingly setting the size and types of staff to meet that demand. For example, in the face of increasing demand, the organization can decide to hire more staff, cross-train existing staff, change overtime and/or vacation policy, or transfer staff from another region.

Scheduling: On a short period (daily, weekly, etc.) as concrete customer demand becomes clearer, micro-level decisions are made regarding the allocation of specific resources to specific demands, e.g. "Service Engineer E will handle task K at time T".

The service-management decision process of the prior art generally suffers from the following drawbacks:

Each phase must be completed and fully committed before a successive stage begins;

No way to back-track;

Work intensive, which results in the need of excessive manpower.

There are many variations on this framework, wherein certain steps in this description may be merged and some other steps split. For example, the scheduling step may be split into a time-commitment (e.g., saying to customer "someone will be at your site tomorrow between 8:00 and 12:00", without committing to which specific service engineer will handle this task), followed by later refinement specifying all the assignment details.

Generally, different functions handle the different types of planning. For example, a higher-level management typically handles the forecasting and capacity planning, while local dispatchers handle the day-to-day detailed scheduling.

In many cases, the planning steps also cross organization boundaries. For example, a large service organization may use a capacity planning to decide on the amount of outsourcing required, and sign appropriate agreements with smaller organizations. Later, when a specific demand arrives, the primary contractor will assign it to one of the subcontractors, but will not make any decision as to which of the subcontractor's employees (and which other resources) will be assigned to the task.

In the prior art, each of these four steps is managed independently and separately, using different manual or computerized tools, with no integrative method of moving information back and forth between the steps. Once a step is performed, it must be completed across all its dimensions (e.g., before moving into capacity planning, you need to do the forecasting for all regions and all task types), and there is no efficient way of moving back and forth across these steps. In today's world, such a structure is no longer effective, because of factors such as:

Outsourcing is very prevalent: larger organizations are created by consolidating smaller ones, and independent organizations tend to cooperate or be in some "competitive" modes;

The tasks become more and more complex; and

The customers expectations become higher.

These procedures are not a good match for real planning needs. Service organizations do not really have several discrete problems, e.g. one for capacity planning and one for fine-tuned scheduling. Rather, they have a continuum of problems, in which part of the demand is presently managed al a macro level and another part of the demand is managed at a micro level.

Figure 1:
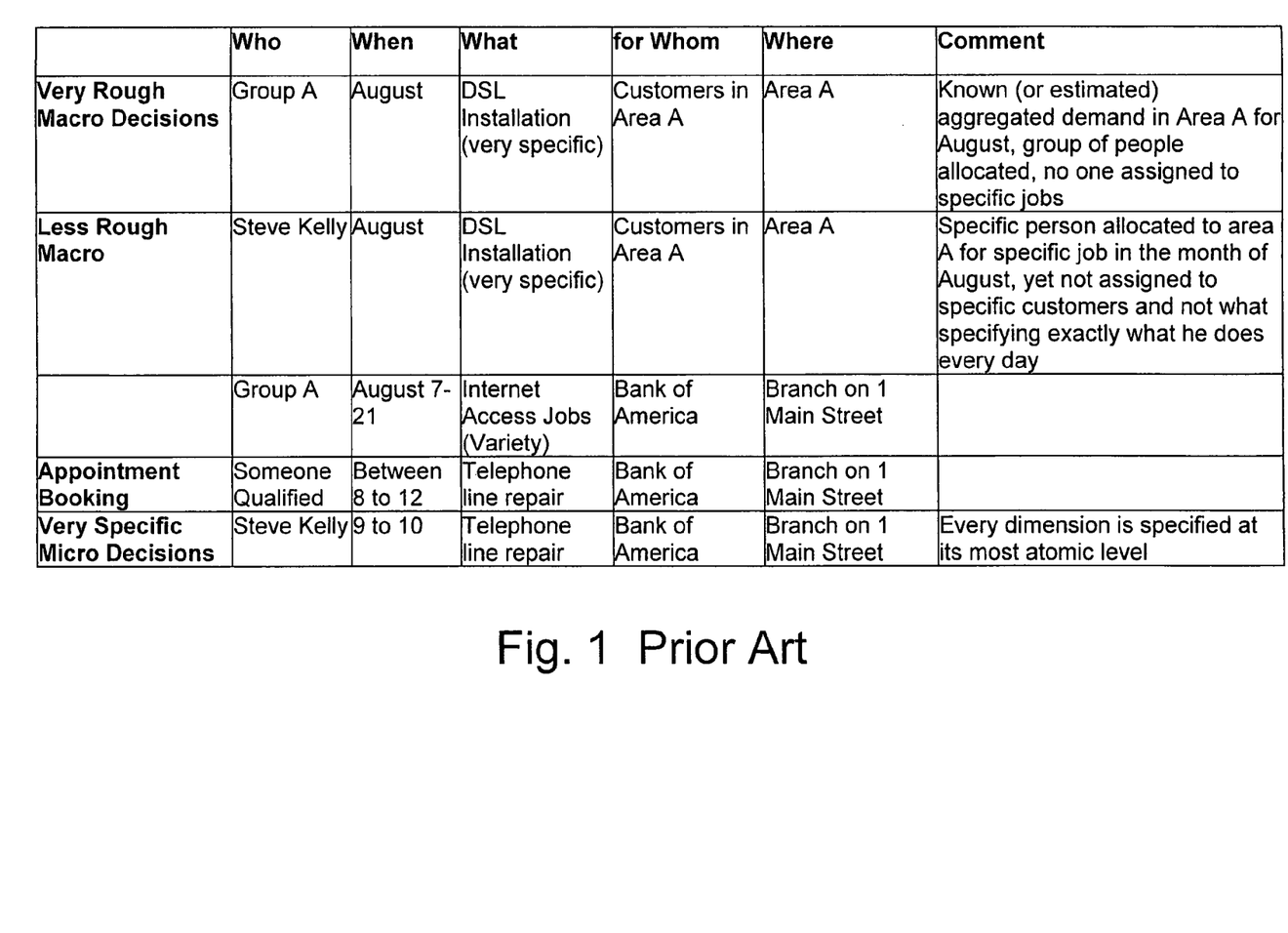
FIG. 1 schematically illustrates the continuous spectrum of decision problems faced by the service organization, according to the prior art.

FIG. 1 schematically illustrates an example of the development of a continuous spectrum of decision problems faced by a service organization, according to the prior art. The columns represent the different decision dimensions—e.g. decision on Who performs some action; What action is performed; etc. Each row describes a different type of decision, where the differences are characterized by the specifity or generality of each part of the decision. For example, on the "Who" dimension, a general decision might affect a whole group of service professionals (such as a whole region) as shown in the first row, while a specific decision might affect only one person.

Existing Service Management Products

In the field-service workforce management world, there exist micro-level scheduling products such as:

ServicePower (http://www.servicepower.com);

MDSI (http://www.mdsi-advantex.com); and others.

In service desk and call-center scheduling, companies such as Blue Pumpkin (http://www.bluepumpkin.com) offers forecasting, staffing, scheduling, reporting and monitoring tools, but they emphasize the step-by-step nature of using these tools.

The disciplines of forecasting, planning, and scheduling arose from the manufacturing industries, where they evolved from MRP (Materials Resource Planning) to ERP (Enterprise Resource Planning). Optimization of such plans falls under the category of Supply Chain Optimization, and is led by companies such as i2 (http://www.i2.com). Such products optimize and synchronize plans across the different product stages from raw material to delivery ("buy-make-move-store-sell").

All the methods described above have not yet provided satisfactory solutions to the problem of human resource assigning to provide services.

It is an object of the present invention to provide a method and system for the assigning of human resources to provide services, upon which the performance of all resource planning steps is contiguous.

It is another object of the present invention to provide a method and system for the assigning of human resources to provide services, upon which the refinement of the results of each step is iterative.

It is a further object of the present invention to provide a method and system for the assigning of human resources to provide services, which allows the organization to make as much or as little commitment at each step at high or low levels of any of the hierarchies as required.

It is a still further object of the present invention to provide a method and system for the assigning, of human resources to provide services, in which the organization is allowed to proceed at different levels for different regions, task types, resource types etc.

It is a still further object of the present invention to provide a method and system for the assigning of human resources to provide services, which allows viewing and analyzing planning status at any level of detail.

It is a still further object of the present invention to provide a method and system for the assigning of human resources to provide services, which enables sharing information and decision workflow between different planning steps, different management functions, different cooperating, organizations, and different levels of detail.

It is a still further object of the present invention to provide a method and system for the assigning of human resources to provide services, in which computer-aided optimization is enabled for each planning step and across planning steps.

Other objects and advantages of the invention will become apparent as the description proceeds.

SUMMARY OF THE INVENTION

The invention is comprised of a set of integrated tools, databases, communication protocols and methods, that together offer a smooth back-and-forth transition between macro and micro decisions.

In one aspect, the present invention is directed to a method for assigning of human resource for service in an enterprise, comprising:

a) Providing data regarding historical needs and future demand for human resource for service, with relevance to skill, geographical position, company and time, the data regards to the enterprise;

b) Forecasting the requirements for human resource for service in long-term according to the data;

c) Planning and updating the human resource according to the forecast, subject to policy and available human resource, and updating the data accordingly;

d) Assigning human resources according to the planning and the availability of human resource, in order to handle recent calls for service;

e) Upon a change in the available human resource for service in the enterprise or upon a change in demand for service in the enterprise or upon a change in the service policy in the enterprise, propagating the effects of the changes to the subjects of the above steps a–d.

f) Continuously analyzing the effects of a–d to detect discrepancies and/or problems resulting from changes, and optionally suggesting ways to resolve the same.

Optionally, the steps of forecasting, planning and assigning are performed simultaneously by different organization members.

The method may further comprise assigning of human resources of the enterprise to another enterprise.

The method may further comprise assigning of human resources of another enterprise to the enterprise.

In another aspect, the invention is directed to a system for assigning of human resource for service in an enterprise, comprising:

A database for storing data regarding historical needs and future demand for human resource for service, with relevance to skill, place, company and time, the data regards to the enterprise;

A module for forecasting future trends of human resource requirements in the enterprise according to historical information, the software module residing on the server and using the database;

A module for planning the human resource according to the forecasted information and subject to policy and available human resource, and for updating the data accordingly, the software module residing on the server and using the database;

A module for scheduling of human resource for handling calls for service, the software module residing on the server and using the database.

The system is characterized in that the forecasting, the planning and the scheduling units are synchronized in order to on-line effect changes in one unit to the other of the two units.

Optionally, the modules for forecasting, for planning and for scheduling are combined into one module.

Optionally, the module for planning and the module for scheduling are combined into one module.

Optionally, the modules are combined into one module.

Optionally, the system operates in coordination with other system(s) of other enterprise(s).

Optionally, the software modules comprise means for interaction with users.

DETAILED DESCRIPTION OF PREFERRED EMBODIMENTS

In order to facilitate the reading of the description to follow, a number of terms are defined below:

W-dimensions: The different types of decisions that characterize customer demand and the decision inherent in answering a customer demand, e.g., specific staff ("Who"), specific times ("When"), specific task ("What"), specific customer ("for Whom"), specific location ("Where"), spare parts or tools ("With what"). Data mining: The analysis of data for relationships that have not previously been discovered. For example, the sales records for a particular brand of tennis racket might, if sufficiently analyzed and related to other market data, reveal a seasonal correlation with the purchase by the same parties of golf equipment.

Data mining results include:

Associations, or when one event can be correlated to another event;

Sequences, or one event leading to another later event;

Classification, or the recognition of patterns and a resulting new organization of data;

Clustering, or finding and visualizing groups of facts not previously known;

Forecasting, or simply discovering patterns in the data that can lead to predictions about the future.

ERP (Enterprise Resource Planning) is an industry term for the broad set of activities supported by multi-module application software that help a manufacturer or other business manage the important parts of its business, including product planning, parts purchasing, maintaining inventories, interacting with suppliers, providing customer service, and tracking orders. ERP can also include application modules for the finance and human resources aspects of a business. The deployment of an ERP system can involve considerable business process analysis, employee retraining, and new work procedures.

The disclosed invention is concerned with integrating and synchronizing the decision processes across management levels and organization boundaries. Other aspects of the invention are:

The focus of this application on human resources, unlike ERP's handling of materials, storage, manufacturing tools and machines, and delivery resources, leading to very different methods of analyzing, forecasting, planning, scheduling, decision process integration, solutions of conflicts and disparities, etc.

The unpredictable-in-detail nature of the demand for customer service, and for the time and resources required to service each demand, vs. the predictable nature of large portions of the supply chain.

The focus of this application on sharing, and applying the same multi-dimensional views, aggregations and dis-aggregations across different decision processes, planning periods and management levels, with the additional innovations (different from multi-dimensional "data cubes" used in Data Mining schemes) of the capability to manipulate data at an aggregated level, and of checking whether the sum of lower-level partitioning is indeed the number stated on the higher hierarchical levels, and providing appropriate alerts and suggestions.

The system of the invention comprises the following modules:

A. Forecasting Module: Macro-level forecasting software, which analyses past demand and actual service operations performance, together with expected future events (e.g., new product launch) to predict demands aggregated or separated along the different W-dimensions. While some of the data used comes from the Analysis module (see below), the Forecasting Module is used as a decision-making tool letting managers define their expectations (out of the different possible predictions and scenarios) and commit to the decision that planning should proceed in a manner consistent with these decisions.

B. Planning Module: Macro-level planning software for analyzing demands at various aggregation levels and rough allocation of resources to meet these demands. This module supports the analysis of expected demands side-by-side with allocated resources, checking the impact of various resource-management decisions on the organization's capability to meet demands (including "what-if" analysis" and managing different alternative scenarios concurrently), and communicating the planning decisions so that they are used in further operations—scheduling, workforce management, training etc.

C. Scheduling Module: Micro-level planning software for assigning specific values to the W-dimensions of each task, including resource assignments, time scheduling and geographic routing.

D. Analysis Module: Analysis, reporting and querying tool for data analysis and data-mining at all levels, from most general to most specific, across any dimension. Analysis supports both human-initiated drill-down and ad-hoc querying and comparison operations, as well as intelligent software-directed data mining tools. This module is concerned mostly with analysis of existing data, and not with any decision-making.

Types of Demands

According to a preferred embodiment of the invention, three types of aggregated demands are distinguished:

1. Group A: Aggregated demands originating from a projected forecast;
2. Group B: Aggregated demand originating from customers who present their demand in an aggregated way only, for example "I need 5000 hours of telephone installation in August"; and
3. Group C: Individualized, itemized known demand that is aggregated into a Group B demand, because a temporarily concern is made only to a rough capacity assessment question, or to a rough resource allocation.

At any given point of time and for a certain time duration, a service manager may be interested in a Planning Module's aggregated answers for the entire demand (A+B+C) for that time duration. Yet for the more immediate horizon, and for the part of Group C individualized demand required in this time duration, the service manager needs to have the Scheduling Module's detailed micro-level scheduling plan.

Types of Usage Workflows

This workflow is similar to workflows used in prior art, but the invention makes it far more efficient by exploiting the smooth transition and decision-propagation between the different modules, as well as the shared data, views and aggregations.

In this section and in the following sections are described manners of use the invention. For clarity, these are separated into different sections, but it is important to note that the integrated nature of this invention enables each user of the system to take the most appropriate path between the options described below, mixing and integrating between work flows, hierarchical levels, and hierarchies along any dimension (i.e., hierarchies of time scales, intra-organizational and inter-organizational structures, geographical regions, demand types, skill sets etc.).

A. Stepwise Usage

1. Use the Forecasting Module to collect historical information as well as future-event information (e.g., new product launch) in order to generate and refine Group A demands;
2. Use the Planning Module for macro-level planning on Group A+B+C;
3. Run the Scheduling Module on Itemized Group C;
4. Run the Analysis Module on the schedule of Itemized Group C to obtain information such as:

For a user-specified time period, what are the total number of service calls delivered in each of the geographic regions;

For any given service engineer, for a user-specified time period, what customers did he work for, how many hours for each one, and the total for that engineer;

For any given customer, for a user-specified time period, which engineers worked for him, and the total work and costs;

Division of work time between actual on-site work, travel, and other (e.g. training, vacation, and absences)—general or specific time of year, region, service engineer's seniority or skills etc.

5. Use the information from Analysis Module to modify and refine Forecasting Module and Planning Module decisions. For instance, average time duration of tasks.

B. Top-Down and Bottom-Up Usage

This workflow exploits the invention's capabilities of supporting multiple hierarchies, aggregations, and discrepancy detection, to smoothly support the process of conciliating downward-flowing management decisions with upward-flowing information from the work force as well as from existing and potential customers.

1. Bottom-up forecasting: Using the Forecasting Module (assisted by Analysis Module) to generate demand predictions on a detailed level (e.g., per each region and/or per each demand type) and propagate the sums upwards to present hither-level aggregations;
2. Top-down forecasting: Using the Forecasting Module (assisted by the Analysis Module) to generate high-level aggregated demand predictions, combine them with management guidelines (e.g., ratios between demand types, training quotas, ratio of travel time to on-site time) and propagate these forecasts downwards;
3. Using the Forecasting Module to detect and resolve discrepancies between high-level and low-level forecast numbers, and between divisions across different dimensions (e.g., size of demand isolated across regional, temporal and demand-type dimensions),
4. Bottom-up planning: Using the Planning Module to allocate resources on a detailed level (e.g. per each region and/or per each demand type) and propagate the sums upwards to present higher-level aggregations;
5. Top-down planning: Using the Planning Module to generate high-level aggregated resource allocations, combined with management guidelines (e.g., budget, overtime policies) and propagate these plans downwards.
6. Using the Planning Module to detect and resolve discrepancies between high-level and low-level resource allocation numbers, and between divisions across different dimensions (e.g., size of demand separated across regional, temporal and demand-type dimensions).

Iterative Usage

This workflow illustrates the complete flexibility usage enabled by the invention, and in particular the capability to iteratively go back to decisions and commitments made in any prior step, and change them. When such a change is made, the system and method described here propagate the effects of the change across all the affected data, hierarchies and decisions. When such a propagation results in a discrepancy, the problem is automatically highlighted and the user is optionally presented with a list of possible decisions that may resolve the problem.

The following is just one example of this complete flexibility:

1. Using the Forecasting module, Jane, the organization's Service Manager, uses the Analysis, Forecasting and Planning Modules to generate a top-level resource allocation plan for the coming quarter—say, Q4 2000.
2. David, the manager for Region A, now needs to refine the details of Jane's top-level plan for the coming quarter. Jane has allocated for region A enough aggregate resources to satisfy the projected aggregate demands for that region. However, using the Planning Module to drill down into region-specific analysis and forecasting, as reflected by the Forecasting Module. David finds that there will not be enough resources in his region to cover the expected demands of a specific type (e.g., not enough service engineers are qualified for network installation).

3. Optionally, the Planning Module suggests several possible resolutions, such as outsourcing, transferring resources from another region, and allowing more overtime.
4. David chooses to resolve the discrepancy by transferring resources from another region. He contacts Joe, the manager of neighboring Region B, to check whether Joe has a surplus of resources for network installation. If so, David and Joe need to check the extra costs and mileage involved in the additional travel (optionally this is another feature of the Planning Module), and record their agreement using the Planning Module so that Jane can see it in detail and in aggregation.
5. If Joe cannot help David, and after David has tried some other solutions (e.g., outsourcing, adding overtime), David will need to ask Jane for additional resources to be allocated in the plan for Region A. Jane then records the extra allocation, and David's Planning Module view shows that his region should be ready to meet the demands. This is an example of modifying an earlier message made in the same module (Planning), with automatic propagation which removes the discrepancy-report for region A, and optionally also updates information in the Human Resources, Finance and other systems.
6. Mary, who is in charge of training in the Human Resources department, uses her own views of the Analysis Module, Forecasting Module and Planning Module and notes the problem in region A. If the analysis and Forecasting Module show that this problem is expected to persist, she modifies training plans and quotas to ensure that the skill distribution—at least in region A—would have a better fit to the demand distribution. This is an example of automatic propagation to systems outside those described in the invention.
7. In the meantime, region C's manager has solved that region's lack of resources by negotiating an outsourcing agreement with Alice, who owns a smaller local service business. Alice enters this as a demand in her own forecasts, and uses the Planning Module to make sure that she has enough resources to fulfill the expected demands, together with this new obligation. This is an example of supporting the coordination of planning and decision-making across organizational boundaries.
8. Time has passed and it is now Monday evening at the beginning of Q4. David (the manager of Region A) has received a list of demands for service to be completed the next day. He uses the Scheduling Module to optimize the dispatch—which service engineer will handle which demand at which time, according to various factors, including customer's Service Level Agreement, customer location, service engineer's skills and spare parts inventory. The Scheduling Module automatically takes into account the rough allocations made in the Planning Module, including decisions such as "reserve engineers with network-installation skills, as many as possible for network-installation demands"; and "if possible, keep spare time for service engineers who are based near the boundary with region B, since the plan lets Region B's manager handle expected demands by requesting assignment of region A resources".
9. More time has passed and it is now the middle of Q4. As always, some of the predictions weren't absolutely accurate. Joe, the manager of region B, uses the Analysis Module to determine why he experienced difficulties in scheduling day-to-day calls, and discovers that the distribution between the north part of his region and the south part has diverged from expectations, with the south region having large demands and necessitating too much travel from the north. Using the Forecasting Module, he updates the aggregate intra-regional demand expectations which automatically highlights a discrepancy in the Planning Module vs. the existing resource allocation. Joe can now resolve this discrepancy using his own resources, using outsourcing; or by using the Analysis Module to check whether any for the neighboring regions to his south has unexpected surplus resources, and then negotiate with that region's manager; or by addressing the problem to the manager for the whole organization. These interactions are supported by a shared access to the data, features and views provided by the Analysis Module, the Forecasting Module, the Planning Module and the Scheduling Module. This illustrates the capability to propagate the effects of new data and new decisions across several different modules, planning horizons, and hierarchy structures, as well as preventing the repeated occurrence of micro-level problems (e.g. difficulty in servicing a specific request on a specific day) by feedback via analysis and forecasting into modified planning and allocation.

Simulation

This section describes an optional capability enabled by this architecture—the capability to bring in simulation tools as a well-integrated part of the performance tracking process, in order to predict problems and check possible solutions as soon as possible.

Allocating enough resources to meet the expected demand is not enough, even after taking account of various times not used for actual service—e.g. training, vacations, health problems—and for time spent in travel between tasks. To achieve more accurate predictions, a following simulation is made, according to the invention:

1. A statistical demand characteristics obtained from historical data collected by Scheduling Module and aggregated using the Analysis Module. These characteristics will describe demand as divided along the different dimensions and their related hierarchies, e.g., region and type of demand.
2. The Forecasting Module is used to project these characteristics into the future period of interest.
3. The Planning Module is used to allocate resources matching the forecasted demands.
4. A stochastic method is used to generate a number of hypothetical samples of a typical day's demands, randomly drawn according to the statistical distributions generated in the previous step.
5. The Scheduling Module is used to schedule each of these sets of demands, using the resources assigned by the Planning Module.
6. The Analysis Module is used to aggregate the detailed results obtained by the Scheduling Module, and checks whether the resources indeed matched the demand under simulated fully-detailed operation.
7. A resource allocation utility at the Planning Module is used to modify resource allocation at the appropriate level (e.g., it may be revealed that the only need is to change allocation between sub-divisions of one region).

8. Repeat simulation if necessary.

The simulation therefore reveals conditions that may create problems in the future.

Top-Level Architecture

Figure 2:
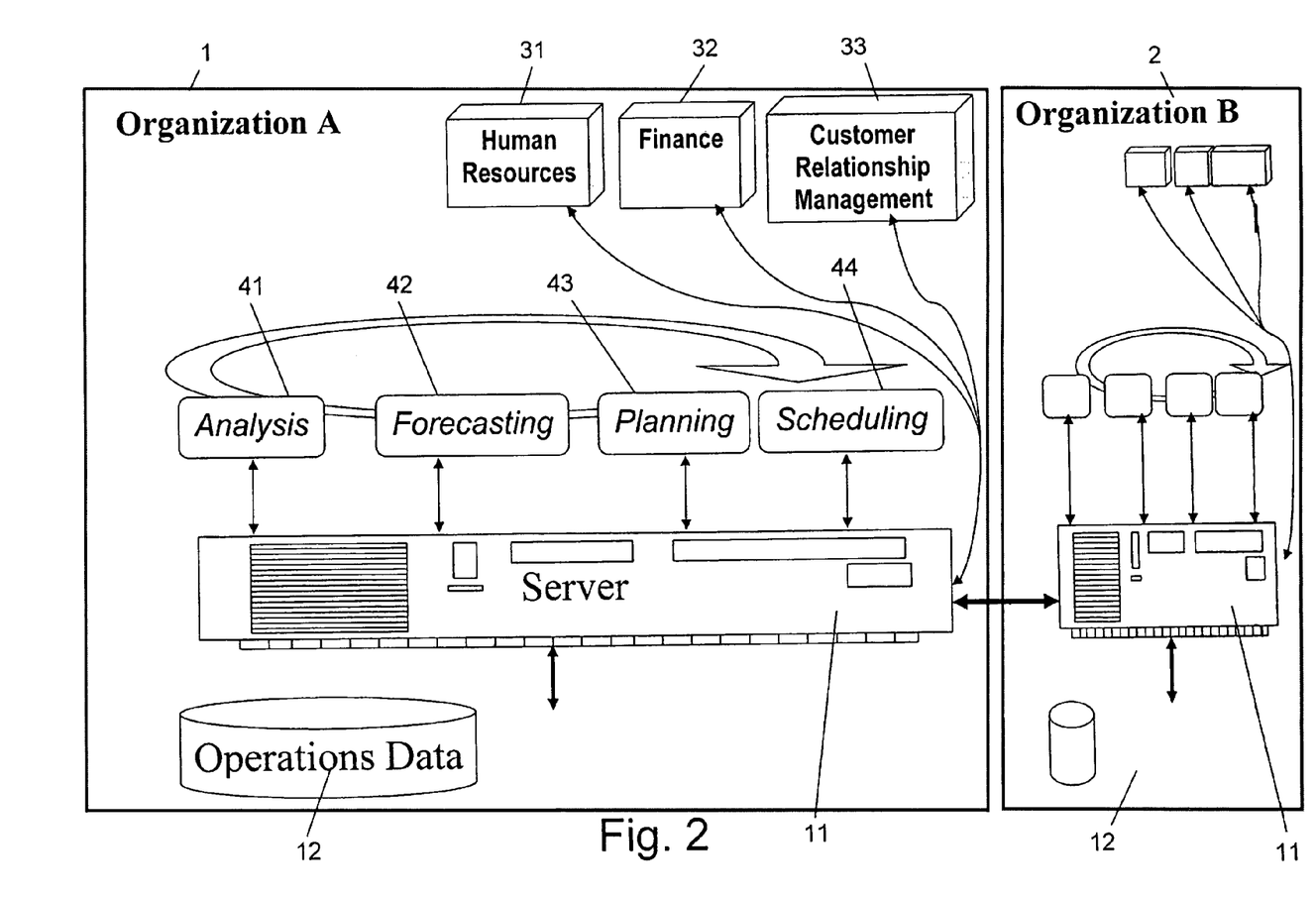
FIG. 2 schematically illustrates a high-level architecture of a system for assigning human resource for providing services, according to a preferred embodiment of the invention.

FIG. 2 schematically illustrates a high-level architecture of a system for assigning human resource for providing services, according to a preferred embodiment of the invention.

It illustrates the integrated access, management and analysis to service operations data within one organization, and the interaction with other organizations. Also shown is the interaction with other corporate Management Information Systems (MIS).

The illustration shows the planning server 11, using the shared database 12 (which may be a set of synchronized databases) to support a client software operated by users concerned with some combination of the basic service management tasks. The system further comprises the four modules Analysis 41, Forecasting 42, Planning 43 and Scheduling 44. The function of each of said modules has been described above.

The server extracts information, and conveys management decisions, to other units, including:

Human resources 31—for interacting with information about available staff, their calendars (i.e., vacation, training, overtime, etc.) and their mix of skills (which may be affected by changes in training plans)

Finance 32—for examining, and reporting, the implications of decisions such as authorizing overtime or subcontracting some work Customer Relationship Management 33—for interacting with past and current data of detailed and aggregated customer demands.

FIG. 2 also shows how two or more organizations using the same system may make their operations and cooperation much more effective by automatically transmitting relevant information between their servers. One example is outsourcing, in which a planning decision in Organization A (marked as 1) to outsource work to Organization B (marked as 2) is conveyed to Organization B, and appears there as a change in forecast demand, requiring re-iteration of the planning process. Such an arrangement optionally enables a large service organization to form customer-facing portals and subcontractor-facing portals to streamline and optimize its operations. Lately, such subcontractor-facing portals have been called B2B (Business-to-Business) applications, as well as "private marketplace" or "public marketplace" depending on their openness.

Such communication implies a protocol for transferring such information. Optionally, the protocol, based on XML (Extensible Markup Language), is a flexible way to create common information formats and share both the format and the data on the World Wide Web, Intranets, and elsewhere. For example, computer makers might agree on a standard or common way to describe the information about a computer product (processor speed, memory size, and so forth) and then describe the product information format with XML. Such a standard way of describing data would enable a user to send an intelligent agent (a program) to each computer maker's Web site, gather data, and then make a valid comparison. XML can be used by any individual or group of individuals or companies that want to share information in a consistent way. Currently a formal recommendation from the World Wide Web Consortium (W3C). XML is similar to the language of today's Web pages, HTML. Optionally, the protocol may be SXP (Service Exchange Protocol), defined by ClickSoftware Technologies Ltd. (SXP is based on XML).

Views, Aggregators, and Dis-Aggregators

To facilitate the integration of decision processes and management levels, different users—or the same users in different steps of their work—require different ways of analyzing, viewing, aggregating or dis-aggregating ("drilling down"). According to a preferred embodiment of the invention, this is supported by the concept of a view, comprised of:

The data field or fields accessible through this view—e.g. work hours, tools, spare parts, overtime allotments.

The source for each field: Work hour numbers may come from the forecasting (prediction of required resources), allocation (decisions on resources made available to operations), or actual data (for times prior to present). Optionally, there may be different subtypes of each source, as when there are several forecasts for August—one from the forecast made in January, one from the forecast made in April, etc., the view is set to display one or more sources for the same field, each with its own values, and optionally highlight discrepancies between the sources.

The propagation direction of each field: Some values may propagate from a previous stage, as when the expected work hours across the whole organization are derived by summing of the expected work hours as reported by each division manager. Other values are propagated from a later stage, as when an Operations Manager has set the work-hour budget for the whole organization, which needs to be divided between the regions. Both directions may—and often do—coexist, and the view may be set to display either of them, or both, and optionally highlight discrepancies between the directions.

A collection of aggregators, one for each W-Dimension—see ahead.

Selected scenario or set of scenarios—see next section.

The aggregators define the hierarchy level referenced by the view in each of the W-Dimensions. For each dimension, the view defines an aggregator that specifies which of the detailed raw data should be aggregated into each of the fields. There may be different ways of defining hierarchies and their matching aggregators. For example, time-dimension aggregators may include division into quarters, months, weeks etc., but they may also divide the time dimension into rainy vs. dry seasons, "normal" periods vs. just-before-holidays and just-after-holiday periods, or mornings vs. afternoons. Location-dimension aggregators may divide the territory according to regions and zip-codes, or they may divide it into urban vs. rural or high-income vs. low-income neighborhoods.

To create aggregators, the user uses aggregation operators to construct higher-level aggregators from lower-level ones, or use dis-aggregation operators ("drill-down") to divide higher-level aggregators into lower-level ones. As mentioned above, according to the invention there are many different aggregation and dis-aggregation operators that may be used on any specific aggregator. Once created, aggregators may be re-used by the same user or other users, subject to user authorization levels.

It is important to emphasize that views are used not just to view data, but also to manipulate it. Changing an aggregated value triggers changes into any other view in use, including aggregations at lower level than the changed value. The effect depends on user preferences and on the actual action performed. Optionally, the modification propagates downwards and upwards, automatically affecting all levels below and above the affected level. Optionally, the modification is not propagated, so that the user can view discrepancies between different propagation directions.

Scenarios

Optionally, the system of the invention supports scenarios for decision-support and "what if" tools. A scenario comprises a set of data, which is inserted into the system (e.g., forecasts, staff size) and a set of decisions (e.g., extended overtime, outsourcing, constraining the allocation of some resources so that they may be used only—or preferentially—for demands of specific type or region). Each scenario generates its own set of data, viewable and manipulable through the shared views and aggregators. As the decision process evolves, some scenarios are modified, some are split to compare different "decision forks", and some are deleted, until a preferred scenario remains and becomes the basis for an actual decision.

Discrepancies and Alerts

As mentioned above, the actions performed by a user while using one view automatically propagated by the software across other views, hierarchy levels, and planning periods. They may also be propagated across organization boundaries, as when a planning-decision in Organization A to outsource work to Organization B is conveyed to Organization B and appear there as a change in forecast demand, requiring re-iteration of the planning process.

According to a preferred embodiment of the invention, when propagating these actions, the system automatically monitors for discrepancies. Discrepancies may take several forms, including:

Discrepancies between a forecast demand and allocated resources.

Discrepancies between different sources of the same information (e.g., forward-looking simulation vs. extrapolation of data using statistical trends analysis).

Discrepancies between different propagation directions, as when the planned resources are both dictated by higher management, propagating downwards, and also reported by regional management, propagating upwards.

Discrepancies between commitments made to customers and actual ability to deliver: For example, a customer may call with a problem and be told "someone will be with you tomorrow between 1 PM and 5 PM", because there appeared to be enough free resources during that time window, and without committing specific resources. Later there will be more calls are received and the software determines that there will be difficulty meeting this commitment, alerting the manager early enough to act, e.g., by diverting resources from another region. Another example for an even shorter planning-period: identifying the situation in which the service engineer is delayed in traffic or in an earlier task and will probably fail to arrive on time to the next task.

Discrepancies may appear in some views and not in others. For example, there may be a good fit between a forecast and a demand when viewed across the whole month, but drilling down would show that during the first half of the month, demand would be higher than the allocated resources can handle.

The system further supports alerts to draw the user's attention to discrepancies. Optionally, the alerts consists of color-coding of areas in the view (e.g., cells in a displayed table) according to the presence and severity of discrepancies.

Optionally, the alerts consist of presenting to the user a list of alerts, possibly ranked and color-coded by their severity.

Optionally, the alerts consist of messages transmitted to users defined as being in charge of reacting and/or resolving each type of alert. Messages may be transmitted by phone, cellular messaging, e-mail, fax, and instant messaging.

Optionally, the alerts consist of any combination of the above mechanisms, configurable according to the user's personal preferences, user type, alert type, and organizational procedures.

The Invention vs. the Prior Art

Figure 3:
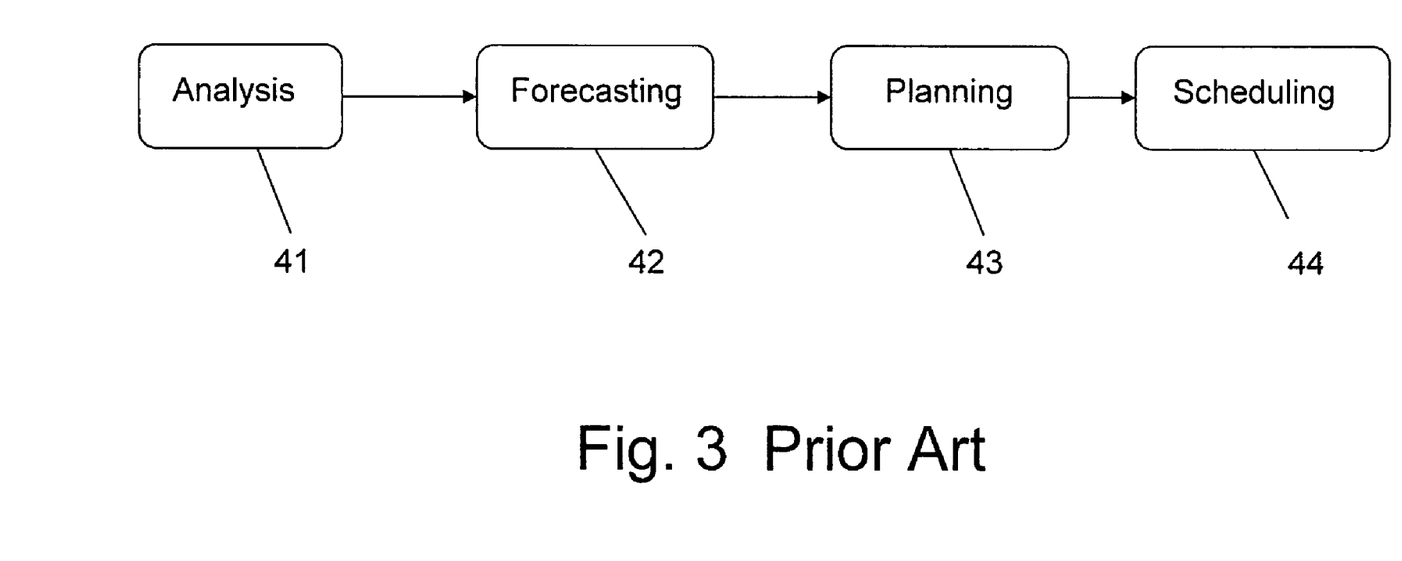
FIG. 3 schematically illustrates the data flow in a system for assigning human resources for providing services, according to the prior art.

FIG. 3 schematically illustrates the data flow in a system for human resource assigning, according to the prior art. It comprises the four stages, discussed above:

Analysis 41, where statistical and data-analysis methods are used in order to project past trends into future expectations of size and types of demands in the regions and time periods of interest;

Forecasting 42, where data from the analysis of the previous stage is combined with knowledge of expected events to get a rough prediction of the number and types of demands in the regions and time periods of interest;

Planning 43, where capacity assessment and planning of manpower is carried out using the forecasted demand data of the previous stage, assessing whether there is a shortage or surplus, and accordingly setting the size and types of staff to meet that demand; and Scheduling 44, where the schedule of the human-resources of the organization is determined on a short period (daily, weekly, etc.) as concrete customer demand becomes clearer, and micro-level decisions are made regarding the allocation of specific resources to specific demands.

Figure 4:
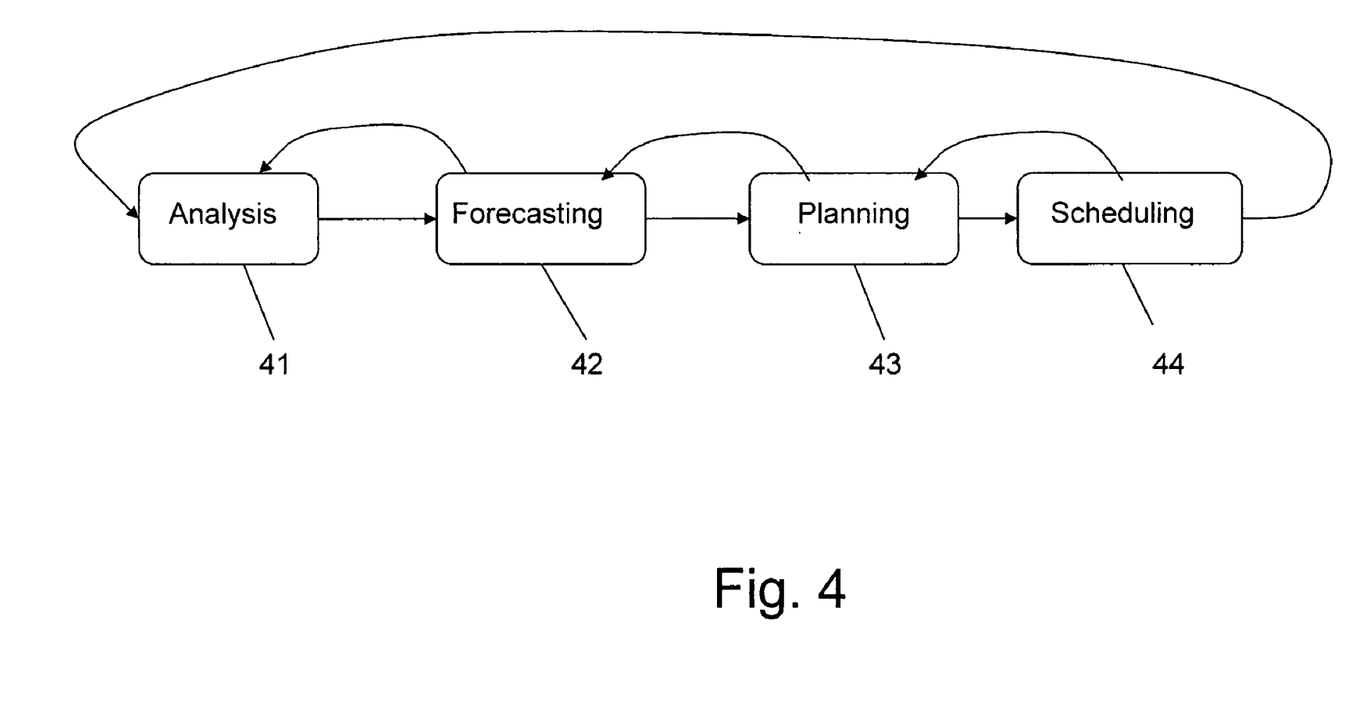
FIG. 4 schematically illustrates the data flow in a system for assigning human resources for providing services, according to a preferred embodiment of the invention.

FIG. 4 schematically illustrates the data flow in a system for assigning human resource for providing services, according to the invention. It comprises the same stages distinguished in the prior art and described in FIG. 3. However, while in the prior art each phase must be completed and fully committed before the next stage starts, and hence the flow goes only forward, according to the invention, the flow may return to the previous step, the data may be altered and the impact of the change may be tested. Hence, barriers are removed, resulting in one contiguous process and the decision process become iterative.

Figure 5:
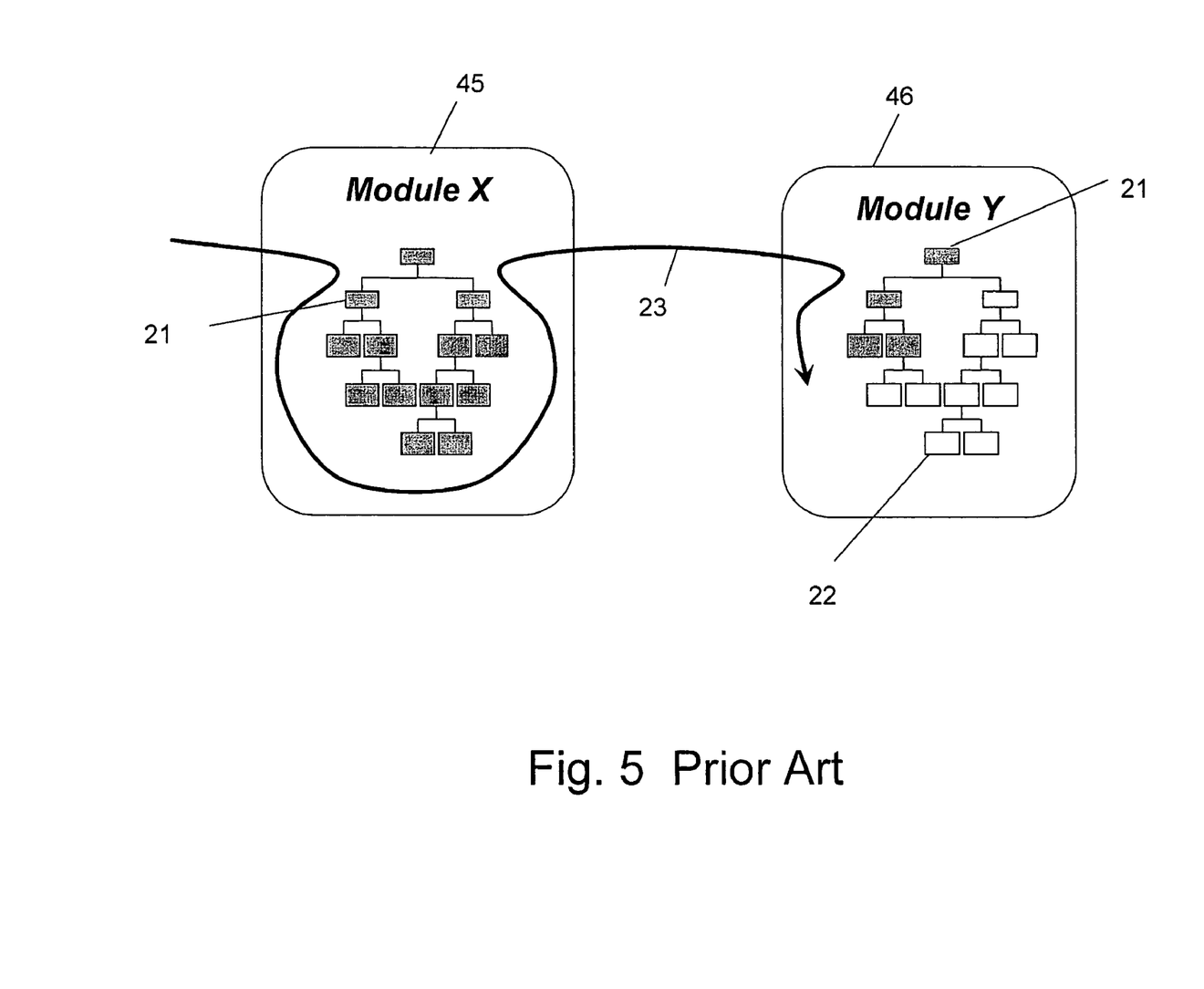
FIG. 5 schematically illustrates a snapshot of a process of assigning human resource for providing services, according to the prior art.

FIG. 5 schematically illustrates a snapshot of a process of human resource assigning for providing services, according to the prior art. Modules 45 and 46 comprise decisions that have already been made and committed, which are marked as 21, and decisions yet to come, marked as 22. The decision sequence is marked as 23.

Regarding the prior art, as presented in FIG. 5, the decisions are made for module X 45 (e.g., forecasting) down to all hierarchical structure, and no other sequence is possible. Only then is it possible to make decisions for the next module Y 46 (e.g. planning). At this point, decisions made in module X 45 are strongly committed—virtually it is impossible to change without affecting the whole hierarchy. Thus, the freedom of action in module Y 46 is constricted.

Figure 6:
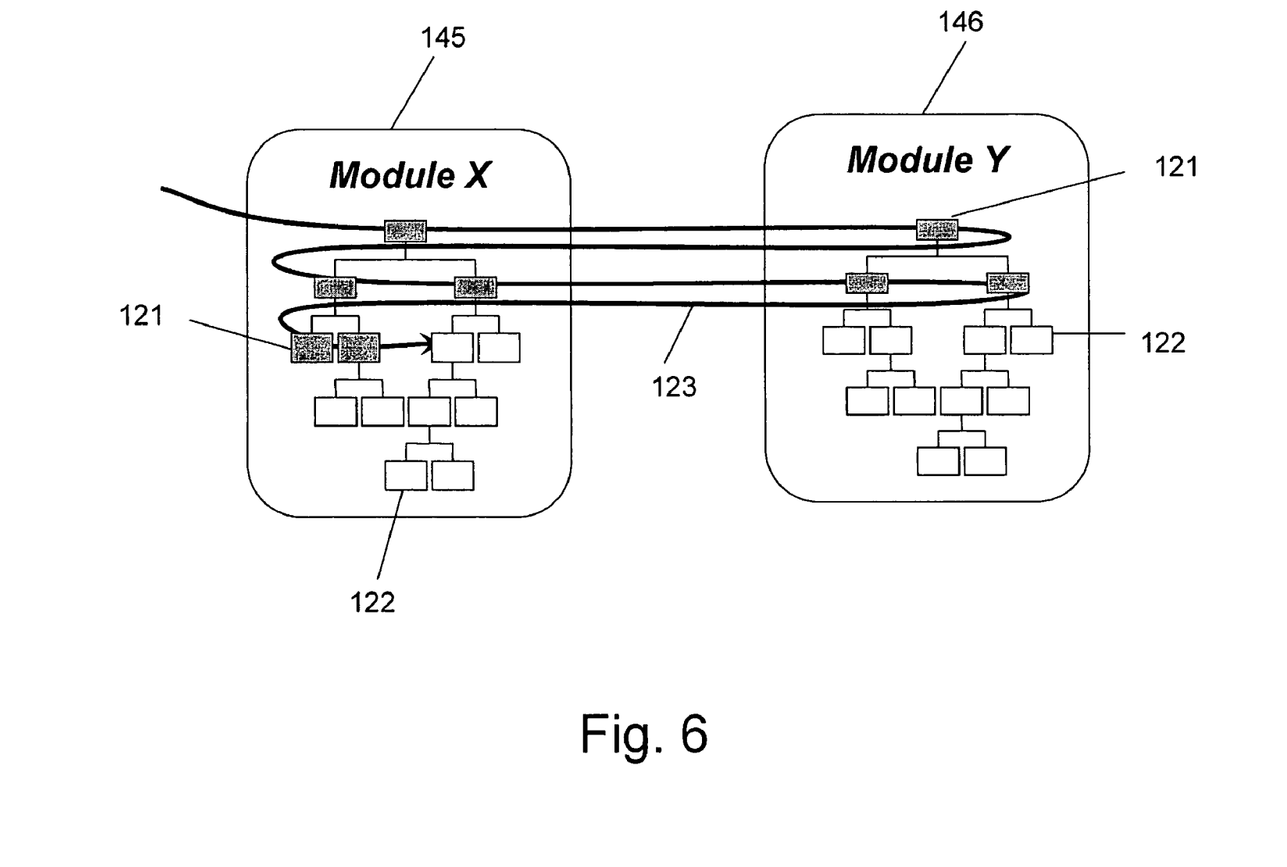
FIG. 6 schematically illustrates a snapshot of a process of assigning human resource for providing services, according to a preferred embodiment of the invention.

FIG. 6 schematically illustrates a snapshot of a process for human resource assigning for providing services, according to the invention. Modules 145 and 146 presented comprise decisions already made and committed, which are marked as 121, and decisions yet to come, marked as 122. The decision sequence is marked as 123.

Regarding the invention as presented in FIG. 6, the decisions are made for top levels in both modules X 145 and Y 146. Many other sequences are possible as well, such as bottom-up. The framework monitors consistency and highlights problems both vertically (between levels) and horizontally (between modules). If the user changes a decision already made, the framework propagates the change vertically and horizontally, and highlights any resulting inconsistencies. Hence, several different scenarios may coexist, each with its own set of decisions in different modules, evolving until the best one is selected and committed.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A system for assigning human resources of an enterprise having a hierarchical departmental structure to service tasks, each actual assignment involving at least the parameters of a task that should be fulfilled, a service-man to perform said task, a time frame during which the task is to be performed, a customer for whom the task is performed, and a geographical region in which the customer is located, comprising:
    a long-term forecasting module executable by a processing device for:
        (a) receiving via a plurality of terminals manual entries of estimated demand for future service tasks;
        (b) calculating estimated demand for tasks to be fulfilled in each specific region within future periods, based on said manual entries and analysis of past demand for service;
        (c) periodically performing an optimization procedure in order to update said calculated demand for tasks;
    a mid-term planning module executable by a processing device for:
        (a) receiving via a plurality of terminals manual entries of actual future service tasks;
        (b) receiving estimated demand for tasks in each region based on analysis of past demand for service;
        (c) assigning one or more service-men to fulfill each of actual service task, and further allocating personnel in each specific region for supporting said estimated demand for tasks; and
        (d) periodically carrying out optimization procedure of said assignments and allocations of service-men for service tasks;
    a short-term scheduling module executable by a processing device for:
        (a) receiving via a plurality of terminals manual entries of actual service tasks;
        (b) assigning one or more service-men to fulfill each actual service task in an optimized manner based on the capability of each available service man; and
        (c) periodically carrying out optimization of previous assignments that have not yet been performed;
    an analysis module executable by a processing device for periodically analyzing past demand for service tasks, performance of said service tasks, and the actual capability of each service-man or the aggregate capability of available service-men, and for updating said mid-term and long-term modules with analysis of past demand for service for the purpose of optimizing the assignments, and for calculating discrepancies in assignments; and
    a coordination module executable by a processing device for iteratively and in a high rate calculating and propagating information relating to the effects of updates in task assignments from said long-term module to said mid-term module, and from said mid-term module to said short-term module and vice versa from said short term module to said mid term module and from said mid-term module to said long term module,
    wherein said assignment forecasting, planning and scheduling manual entries are entered to said modules by personnel of different hierarchy levels of the enterprise, and wherein said iterations are performed in such a high rate to essentially immediately propagate effects of task updates up and down through all said modules; and wherein the short-term module corresponds to assignments in a time period of up to several days ahead, the mid-term module corresponds to a time period of between several days and up to several weeks ahead, and the long-term module corresponds to a time period from several months and up ahead.

2. The system according to claim 1, wherein the human resources are divided into groups, according to geographical location.

3. The system for assigning human resources according to claim 1, wherein the human resources are further divided into groups according to skills.

4. The system according to claim 1, wherein each assignment is regarded as valid only if the service-man has skills for carrying out the service task.

5. The system according to claim 1, further comprising communication means for sharing of assignment information with other enterprises having a same system.

6. The system according to claim 1, wherein said module for forecasting and said module for planning are combined into one module.

7. The system according to claim 1, wherein said module for planning and said module for scheduling are combined into one module.

8. A program encoded in a computer readable medium for controlling a programmable computer to assign human resources of an enterprise having a hierarchical departmental structure to service tasks, each actual assignment involving at least
    the parameters of a task to be fulfilled,
    a service-man to perform said task,
    a time frame during which the task is to be performed,
    a customer for whom the task is performed, and
    a geographical region in which the customer is located,
    said program comprising:
    a long-term forecasting module for:
    receiving first manual entry data via a plurality of terminals, said first manual entry data representing manual entries of estimated demand for future service tasks;
    calculating estimated demand for tasks to be fulfilled in each specific region within future periods, based on said first manual entry data and analysis of past demand for service; and
    periodically performing an optimization procedure in order to update said calculated demand for tasks;
    a mid-term planning module for:
    receiving second manual entry data via a plurality of terminals, said second manual entry data representing manual entries of actual future service tasks;

receiving estimated demand for tasks in each region based on analysis of past demand for service;

assigning one or more service-men to fulfill each of actual service task, and further allocating personnel in each specific region for supporting said estimated demand for tasks; and periodically carrying out optimization procedure of said assignments and allocations of service-men for service tasks;

a short-term scheduling module for:

receiving third manual entry data via a plurality of terminals, said third manual entry data representing manual entries of actual service tasks;

assigning one or more service-men to fulfill each actual service task in an optimized manner based on the capability of each available service man;

and periodically carrying out optimization of previous assignments that have not yet been performed;

an analysis module for periodically analyzing past demand for service tasks, performance of said service tasks, and the actual capability of each service-man or the aggregate capability of available service-men, and for updating said mid-term and long-term modules with analysis of past demand for service for the purpose of optimizing the assignments, and for calculating discrepancies in assignments; and a coordination module for iteratively and in a high rate calculating and propagating information relating to the effects of updates in task assignments from said long-term module to said mid-term module, and from said mid-term module to said short-term module and vice versa, from said short term module to said mid term module and from said mid-term module to said long term module, wherein said assignment forecasting, planning and scheduling manual entries are entered to said modules by personnel of different hierarchy levels of the enterprise, and wherein said iterations are performed in such a high rate to essentially immediately propagate effects of task updates up and down through all said modules; and wherein the short-term module is operative with assignments in a time period of up to several days ahead, the mid-term module is operative with a time period of between several days and up to several weeks ahead, and the long-term module is operative with a time period from several months and up ahead.

9. The program according to claim 8, wherein the human resources are divided into groups, according to geographical location.

10. The program for assigning human resources according to claim 8, wherein the human resources are further divided into groups according to skills.

11. The program according to claim 8, wherein each assignment is regarded as valid only if the service-man has skills for carrying out the service task.

12. The program according to claim 8, being further operative to perform the step of sharing assignment information with other enterprises having a same program operating on a programmable computer.

13. The program according to claim 8, wherein said module for forecasting and said module for planning are combined into one module.

14. The program according to claim 8, wherein said module for planning and said module for scheduling are combined into one module.

* * * * *